United States Patent

[11] 3,566,138

[72] Inventor Gernot Gottschall
    Boblingen, Germany
[21] Appl. No. 851,561
[22] Filed Aug. 20, 1969
[45] Patented Feb. 23, 1971
[73] Assignee Franz Morat GmbH
    Stuttgart-Vaihingen, Germany
[32] Priority Aug. 21, 1968
[33] Germany
[31] P 17 97 14.9

[54] PHOTO-ELECTRIC TAPE READER HAVING PLURALITY OF INTERCHANGEABLE MAGAZINES EACH CONTAINING A TAPE OF DIFFERENT LENGTH
16 Claims, 11 Drawing Figs.
[52] U.S. Cl..................................................... 250/219,
    179/100.2
[51] Int. Cl...................................................... G01n 21/30
[50] Field of Search........................................... 250/219;
    179/100.2 (ZX); 274/(Inquired); 242/(Inquired);
    226/(Inquired)

[56] References Cited
UNITED STATES PATENTS
3,046,407 7/1962 Hoffman .................... 250/219
3,482,839 12/1969 Wolfner ..................... 179/100.2

*Primary Examiner*—Archie R. Borchelt
*Assistant Examiner*—Martin Abramson
*Attorney*—Michael S. Striker ABSTRACT: A plurality of magazine units, each supporting an endless record carrier tape of different length, can be used with the same readout unit. Each endless record carrier tape is looped about selected guide rollers and passes between a pair of output rollers of each magazine to form a free readout loop. When a selected magazine unit is attached to the readout unit, sensing means of the readout unit sense the readout loop of the respective selected endless record carrier tape. The guide rollers and output rollers of each magazine are positioned so that differently looped endless record carrier of different lengths can be placed on the guide rollers and output rollers.

INVENTOR.
GERNOT GOTTSCHAL

By Michael S. Striker
Attorney

INVENTOR
GERNOT GOTTSCHALL

PHOTO-ELECTRIC TAPE READER HAVING PLURALITY OF INTERCHANGEABLE MAGAZINES EACH CONTAINING A TAPE OF DIFFERENT LENGTH

BACKGROUND OF THE INVENTION

It is known to control machines, particularly the needles of a knitting machine, by electromagnetic means controlled by impulses produced by the sensing of record carrier tapes. The record carrier tape may have light-permeable recordings arranged in longitudinal tracks, and endless record carrier tapes of different lengths are used for different knitted patterns and mounted in a magazine.

The U.S. Pat. No. 3,317,735 discloses a sensing arrangement in which a driven transporting roller, constructed as a cylinder lens, moves the tape out of an exchangeable magazine in which the tape is laid in several loops on two freely rotatable rollers. This arrangement has the disadvantage that, when the tape is removed from the magazine, or when the tape is transported by the cylinder lens, a frictional engagement and abrasion of the tape surface, and high pressure on the cylinder lens cannot be avoided so that the recording surface of the tape is scratched by unavoidably deposited dust, and the scratches may cause wrong command signals.

It is one object of the invention to overcome this disadvantage of the prior art, and to provide a sensing arrangement for record carrier tapes in which the support roller on which the tape is located while being sensed, is subjected to little pressure.

Another object of the invention is to support the tape in the region of the sensing means by a support roller which has two freely rotatable end portions engaging the marginal portions of the tape, while the record carrying central portion of the tape is not in contact with the support roller.

Another object of the invention is to provide stationary optical means on the shaft on which the two end portions of the support roller are mounted.

An important object of the invention is to provide a plurality of exchangeable magazine units for a single readout unit so that differently looped endless tapes of different magazines can be used with the same readout unit.

Another object of the invention is to provide a magazine with a predetermined number of guide rollers so that endless record carrier tapes of different lengths can be differently looped about the guide rollers, while a loop of constant length is formed between two output rollers, and can be read out by the same sensing means.

Another object of the invention is to drive transporting rollers leading and trailing the support roller of the sensed portion of the tape so that the support roller is rotated by the moving tape.

Another object of the invention is to resiliently bias the trailing transporting roller.

With these objects in view, the present invention provides a sensing arrangement for endless record carrier tapes of different lengths. One embodiment of the invention comprises a plurality of magazine units, each of which can be selectively attached to the same readout unit.

Each magazine unit includes a first support, two output rollers, a predetermined number of guide rollers, and an endless record carrier tape looped about selected guide rollers and passing between said pair of output rollers to form a free readout loop. The readout loops of all magazine units have the same length, the output rollers have the same position.

The readout unit includes a second support to which the first support of a selected magazine unit is detachably attached, transporting rollers engaging the readout loop of the selected magazine unit for transporting the same and thereby the respective endless record carrier tape, and sensing means for reading out recordings on successive transported portions of the readout loop and generating corresponding impulses.

Each endless record carrier tape is associated with different machine operations, for example with different numbers of revolutions of a circular knitting machine so that the tracks of the recordings are of different lengths, and require endless tapes of different lengths.

The guide rollers and output rollers of the magazine are disposed for supporting differently positioned magazine loops of any selected endless record carrier tape, and the readout loop of the selected endless record carrier tape projects between the output rollers in a position adapted to be read out, so that the same magazine can be used for any one of a plurality of endless record carrier tapes of different length having information of different length recorded thereon.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENT

As schematically indicated in FIGS. 1 and 6 to 11, the apparatus includes a readout unit which comprises transporting means 1, illuminating means 2, and sensing means 3. A magazine unit 4 is detachably attached to the readout unit 1, 2, 3. Several magazine units 4, mounting endless record carrier tapes F of different lengths and differently looped, as shown in FIGS. 1 and 6 to 11, can be used with the same readout unit.

The stationary readout unit 1, 2, 3 includes a support plate 123 on which driven transporting rollers 101 and 102 are mounted for rotation, together with a support roller 125. The sensing means 3 are mounted on a slide 307 for movement toward and away from the support roller 125. The illuminating means 2 are also mounted on support plate 123.

Each of the magazine units 4 shown in FIGS. 1 and 6 to 11 includes a support plate 401, and a number of guide rollers 415 to 425 mounted for free rotation on support plate 401. When endless record carrier tapes F of different length are used, as shown in FIGS. 1, and 6 to 11, they are laid in different loops about the guide rollers 415 to 425, but the output rollers 402 and 403 form a readout loop of constant length in any endless tape, passing from the confronting face portions of output rollers 402, 403 over transporting rollers 101 and 102, and freely rotatable support roller 125.

Consequently, although each of the magazine units 4 shown in FIGS. 1 and 6 to 11 have endless record carrier tapes of different length, any magazine unit can be selectively used with the readout unit 1.

Each magazine unit 4 is also constructed so that the same arrangement of guide rollers 415 to 425, together with output rollers 402, 403, can be used for exchangeable endless record carrier tapes of different length, since the different tapes can be looped differently about selected guide rollers 415 to 425. However, the length of the free readout loop projecting between output rollers 402, and 403, must be the same, irrespective of the length of the endless record carriers which are placed on the magazine.

Any one of the magazine unit 4, and more particularly the support plate 401 thereof, can be detachably secured to the support plate 123, or to a common base for support plates 123 and 401, so that the readout unit 1, 2, 3 is surrounded by guide rollers 415 to 425, and output rollers 402, 403, permitting the different tape positions shown in FIGS. 1 and 6 to 11, without interference of the tape with the readout unit 1, 2, 3. The relative position of the readout loop formed by output rollers 402, 403, transporting rollers 101 and 102, and support roller 125 remains the same irrespective of which magazine unit 4 is attached to the readout unit 1, 2, 3.

All rollers used in the apparatus are constructed so that they engage the tape only in the marginal portions thereof where perforations are provided cooperating with sprocket means of the rollers. Between the engaging end portions of the rollers, central roller portions of smaller diameter are provided which are spaced from the central portion of the transported tape, so that the same cannot be scratched in the central region where the recordings are provided. Pressure rollers 112 and 113, see FIG. 3, cooperate with transporting rollers 101 and 102, and have end portions formed with circular grooves into which the sprocket teeth of the transporting rollers 101 and 102 project so that the perforated marginal portions of the tape are reliably held. All rollers are mounted in the respective support plates so that they cannot be displaced in axial direction.

Figure 2:
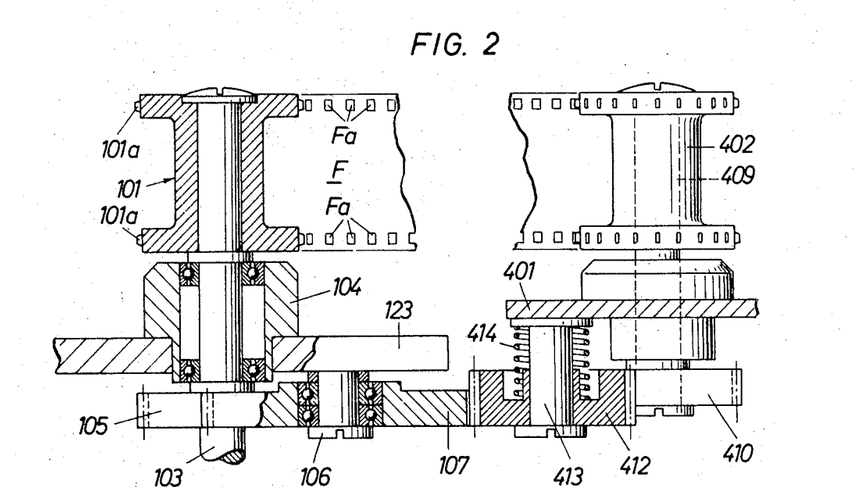
FIG. 2 is an elevation, partly in section along the line A-B-C-D in FIG. 3, and illustrating the drive connection between the transporting rollers of the readout unit and the output rollers of the magazine unit of the embodiment of FIG. 1.
Figure 3:
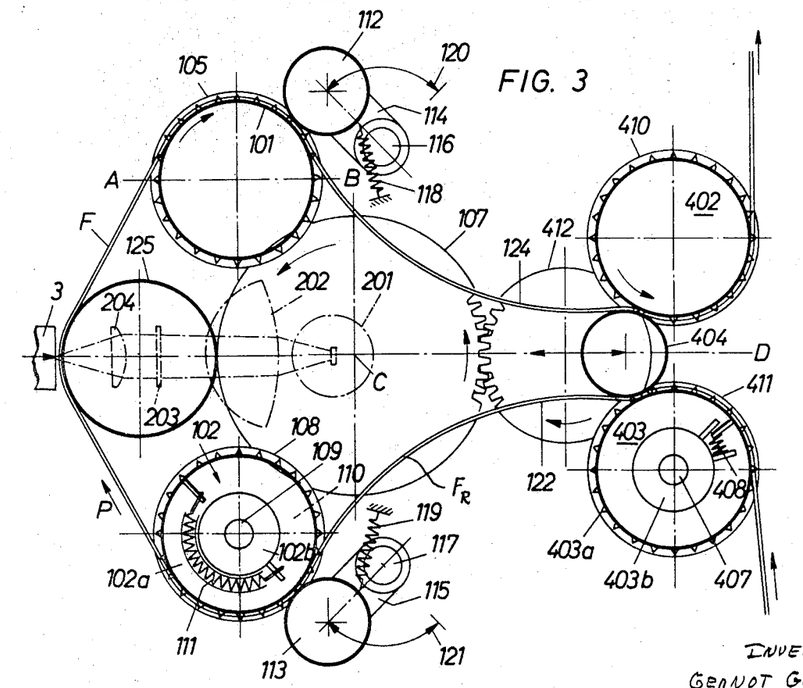
FIG. 3 is a schematic plan view of the parts of the apparatus shown in FIG. 2.

Referring now mainly to FIGS. 2 and 3, transporting rollers 101 and 102 include sprocket and end portions 101a and 102a which engage perforations in the longitudinal marginal portions Fa of tape F.

Transporting roller 101 is mounted on a shaft 103 which is supported in a bearing 104 on support plate 123. The lower portion of shaft 103 is driven from the knitting machine so that tape F is moved at the rhythm of the machine operations. When the impulses produced by the readout unit are used for controlling the needles of a circular knitting machine by electromagnetic means, the tape must move at the same speed as the periphery of the needle cylinder.

A gear 105 is fixed to shaft 103 directly under support plate 123, and meshes with an intermediate gear 107 mounted in a bearing 106 under support plate 123. Intermediate gear 107 is so positioned that it also meshes with a gear 108 which is fixed to a shaft 109 which carries transporting roller 102, and more particularly the inner central portion 102b of the same on which two sprocket end portions 102a are rotatably mounted. As schematically indicated in FIG. 3, the sprocket end portions 102a are connected by a spring 111 with the inner portion 102b which is driven from drive shaft 103 through the gears 105, 107, 108.

The driven transporting roller 102 transmits a tensioning force to the endless tape F and pulls the same in the direction of the arrow P so that spring 111 is tensioned whereby the transported portion of the tape passing over the freely rotatable support roller 125 is tensioned to a predetermined degree so that no readout errors are made when a recording passes the readout head 3.

If the tension of the tape becomes too great so that the tape breaks, the sprocket end portions 102a are turned by spring 111 opposite to the transporting direction, whereby a small spring-biased slide in shaft 109 is released for shifting a bar magnet about 10 millimeters whereby a contact secured to support plate 123 is opened, and the drive motor of the machine is stopped not illustrated.

Pressure rollers 112 and 113 lead and trail, respectively, the leading and trailing transporting rollers 101 and 102, and are mounted on lever arms 114 and 115, respectively, whose pivots 116 and 117, respectively, are mounted on support plate 123. A coil spring 118 and 119, respectively, holds the pressure rollers 112, 113 in operative positions. However, pressure rollers 112, 113 can be turned to inoperative positions 120 and 121, as schematically indicated in FIG. 3, when the magazine unit 4 is exchanged, and the readout loop $F_R$ which begins in the region 122 and ends in the region 124, has to be detached from the sprocket of transporting rollers 101 and 102, and removed from the support roller 125. After the readout loop $F_R$ of the magazine unit 4 has been removed, another magazine unit 4 is attached to the support plate 123, and the readout loop $F_R$ of the new magazine unit is laid about the transporting rollers while the pressure rollers 112 and 113 are still inoperative.

Since the output rollers 402 and 403 of all magazine units are in the same position, and since all readout loops $F_R$ have the same length, magazines having endless tapes of different length can be exchanged for each other for cooperation with the same readout unit 1, 2, 3.

Figure 4:
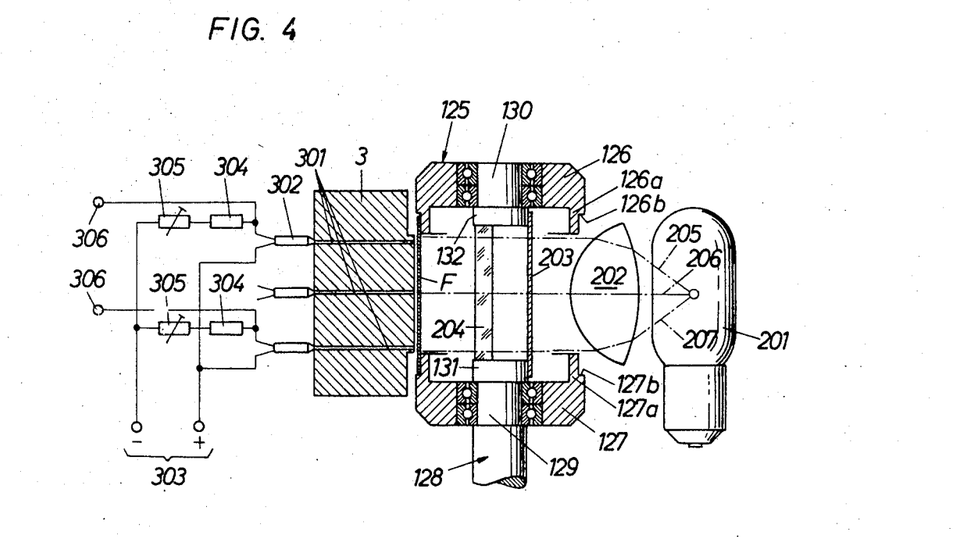
FIG. 4 is an elevation, partly in sections, combined with a circuit diagram and illustrating the tape support roller, and the sensing means and illuminating means of the embodiment of FIG. 1.
Figure 5:
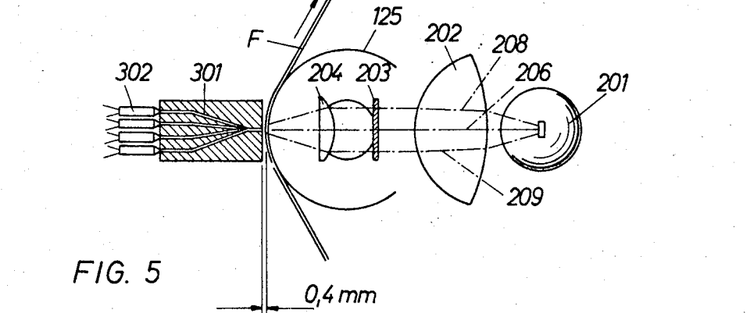
FIG. 5 is a fragmentary plan view of the parts shown in FIG. 4.
Figure 6:
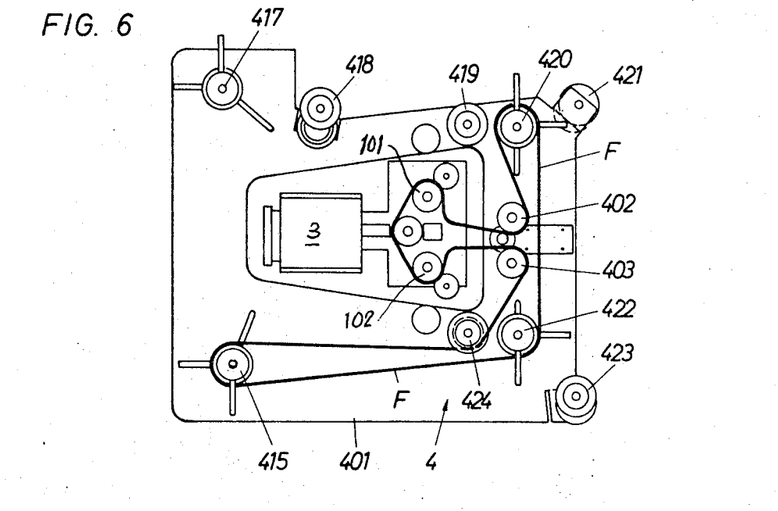
FIGS. 6 to 11 are schematic plan views corresponding to FIG. 1, but illustrating magazines provided with endless record carrier tapes of different length for controlling between two and more than 10 needle cylinder revolutions.
Figure 7:
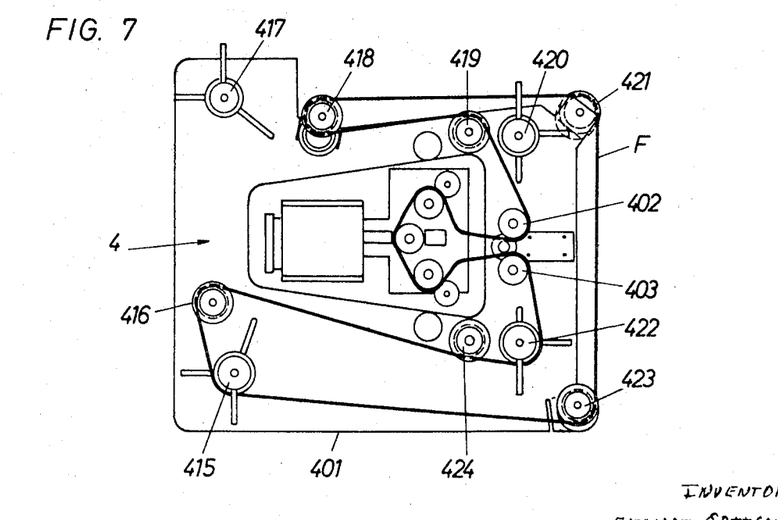
Figure 8:
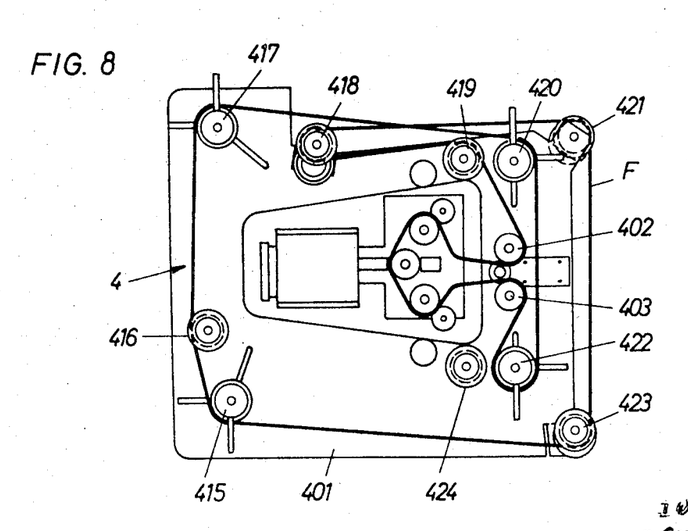
Figure 9:
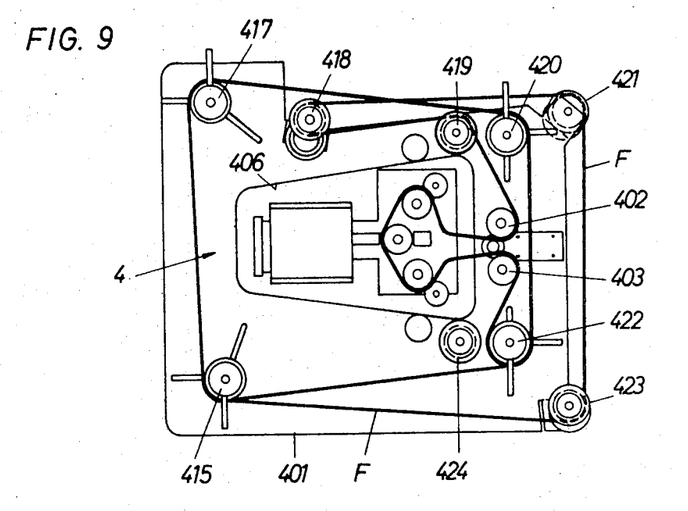
Figure 10:
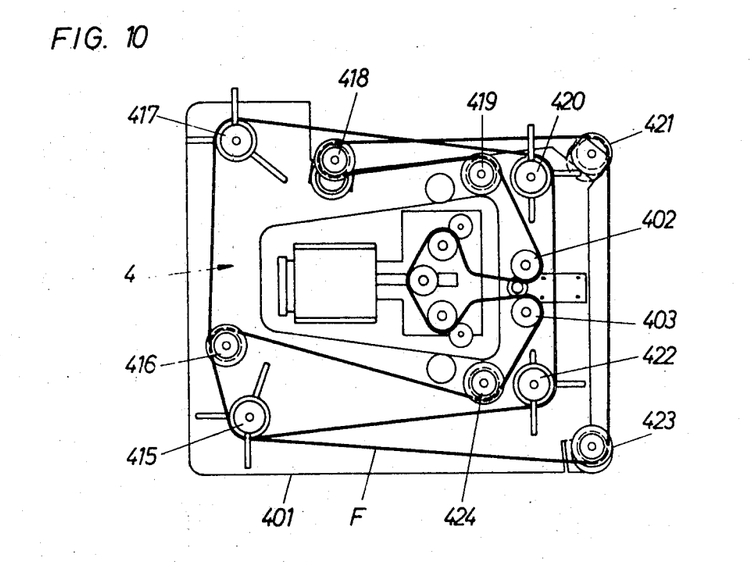
Figure 11:
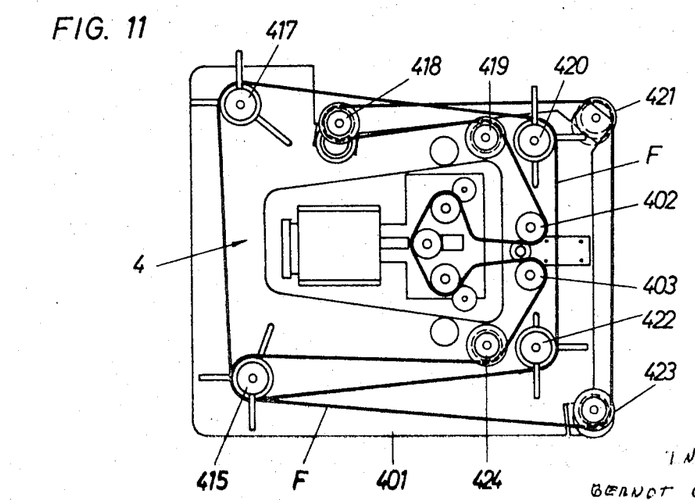

As noted above, support roller 125 is rotated by tape F, when the same is transported by transporting rollers 101 and 102. Support roller 125 is positioned so that the surface of tape F is spaced a distance of substantially 0.5 mm. from the confronting face of the readout head, as best seen in FIG. 5. Support roller 125 is composed of an upper roll 126 and a lower roll 127, as best seen in FIG. 4. Rolls 126 and 127 are mounted on a common shaft means 128 for free rotation. A journal portion 129 supports a bearing for roll 127, and a journal portion 130 supports a bearing for roll 126. The journal portions 129 and 130 carry discs 131 and 132, respectively, between which transparent optical means including a filter 203 for heat radiation, and a planar-convex cylinder lens 204 are fixedly secured.

Each roll 126 and 127 has a cylindrical portion 126a, 127a, respectively, bounded by outer shoulders 126b, 127b, respectively, on which a portion of tape F abuts so that the tape is confined by shoulders 126b and 127b, and cannot be displaced in axial direction.

Illuminating means for the tape are provided including a amp 201, and a spherical condenser lens 202, both mounted on support plate 123 by means, which are not illustrated. The rays from lamp 201 follow the paths 205, 206, and 207, are made parallel by condenser lens 202, and then pass through heat filter 203 and spherical lens 204 so as to a illuminate a narrow strip-shaped portion of the record carrier tape F, whose recordings are light-permeable dots arranged in parallel tracks. In position of FIGS. 4 and 5, in which the tape is transported in a horizontal plane, the tracks are also horizontal and vertically spaced from each other.

In the magnetic readout head 3, 40 light-guiding rods 301 are provided, only three being shown in FIG. 4, and four being shown in FIG. 5 for the sake of simplicity. Depending on the distribution of the light-permeable recordings in the 40 tracks of tape F, light pulses pass through different light-guiding rods 301, and enter phototransistors 302, of which also 40 are provided. However, since the tracks of the record carrier F are spaced very small distances from each other, the light-guiding rods 301 are bent in two planes so that these 40 phototransistors 202 can be arranged in four rows of 10 phototransistors, instead of in a single row.

All phototransistors 302 are connected with a voltage source 303 whose negative terminal is connected with each phototransistor 302 by a limiting resistor 304 and an adjustable resistor 305. The output terminals 306 of phototransistors 302 are connected through amplifiers, not shown, with electromagnetic and mechanical means by which the needle selection of the knitting machine is controlled.

A circular knitting machine whose knitted pattern is controlled by the impulses produced by the 40 photo transistors 302, has, for example, 36 knitting stations controlled by 36 tracks on tape F. The impulses produced in the phototransistors in accordance with the recordings in the respective tracks are amplified, and control electromagnetic means by which needle-controlling elements are shifted for guiding the needles either to a knit position; or to an inoperative position. The remaining four tracks of the record carrier tape, and the remaining four phototransistors are used for controlling auxiliary operations.

The magnetic readout head 3, the phototransistors 302, and the resistors 304 and 305 are all mounted on a slide 307 which is movable on the support plate 123 toward and away from support roller 125. When the magazine unit 4 is to be removed and exchanged for another magazine unit, the readout means 3 are moved away from the readout loop $F_R$ and support roller 125, so that the readout loop $F_R$ can be easily removed from the support roller 125 and transporting rollers 101 and 102 without the possibility of scratching the surface of the tape on the confronting surface of the readout head.

Figure 1:
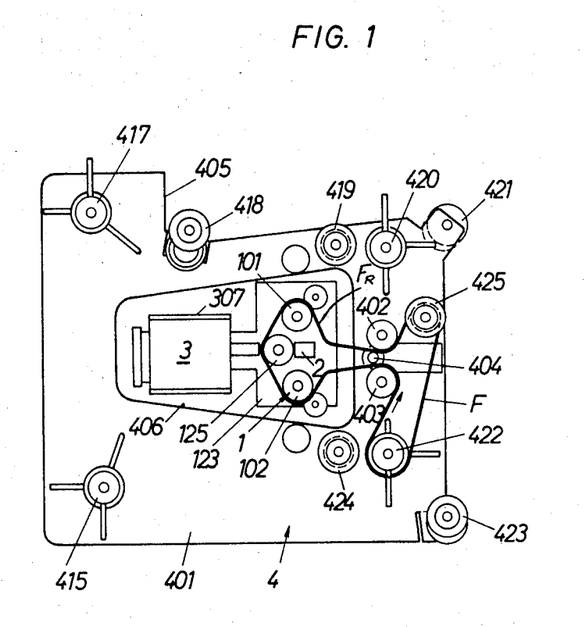
FIG. 1 is a schematic plan view illustrating an embodiment of the invention provided with an endless record carrier tape of short length.

As shown in FIG. 1, support plate 401 is substantially rectangular and has a peripheral cutout 405 and a central cutout 406 of trapezoidal shape. The edges of cutout 406 are spaced from the support plate 123, so that the magazine unit 4 can be exchanged without touching any part of the readout unit 1,2,3.

The support plate 101 of the magazine unit 4 is located slightly above the top surface of the stationary support plate 123, and is attached by screws, or to other conventional detachable fastening means to support plate 107.

Output rollers 402 and 403, and transporting rollers 101 and 102 are arranged symmetrically to a plane of symmetry C,D which passes through the axis of support roller 125. The construction of output roller 110 is the same as the construction of guide roller 105, and the construction of output roller 403 corresponds to the construction of transporting roller 102. A common pressure roller 404 is provided with circular grooves in its end portions receiving the sprocket teeth of output rollers 402 and 403. Pressure roller 404 holds the record carrier tape F on the sprockets of output roller 402, and on the sprocket rings 403a of output roller 403. Since pressure roller 404 together with output rollers 402 and 403 holds the readout loop $F_R$, the magazine unit 4 can be removed from the readout unit 1,2,3 without disturbing the readout loop $F_R$, and the looped endless tape on the respective magazine unit 4. When the endless tape F on the guide rollers 415 to 425, and output rollers 402, 403 is to be exchanged for another differently looped endless tape of different length, see FIGS. 6 to 11, pressure roller 404 is retracted to the left to an inoperative position permitting removal of the perforated tape from the sprockets of output rollers 402 and 403.

The sprocket end portions 403a of output roller 403 are connected by a spring 408 with the central portion 403b which is secured to shaft 407 carrying a fixed gear 411. A gear 410 is fixed to output roller 402, and gears 410 and 411 mesh with a coupling gear 412 which meshes with the intermediate gear 407 which is connected by gears 405 and 408 with the transporting rollers 101 and 102. Consequently, output rollers 402 and 403 are driven at the same speed as transporting rollers 101 and 102, all gears being driven from drive shaft 103.

Coupling gear 412 is mounted on a shaft 413 secured to the underside of the support plate on each magazine unit 4. A spring 414 urges coupling gear 412 to the position illustrated in FIG. 2 so that the gears 410 and 411 of output rollers 402 and 403 are driven from intermediate gear 107 when a magazine unit is attached to the readout unit.

When coupling gear 412 is pushed to a higher position, it remains in meshing engagement with gears 410 and 411, but separates from intermediate gear 107, as required during exchange of a magazine unit. Since gear 412 continues to mesh with gear 410 and 411, output rollers 402 and 403 do not turn, and the constant length of the loop $F_R$ is not disturbed while the magazine unit is removed, and another magazine unit substituted. When a selected magazine unit has been attached to the readout unit, coupling gear 412 is released by the operator, and assumes a position coupling intermediate gear 407 with gear 410, 411, as best seen in FIG. 2.

The support plate 401 of the magazine unit 4 carries, in addition to the output rollers 402, 403, guide rollers 415 to 425, of which guide rollers 418, 421 and 423 have axes slanted to the surface of the support plate 401.

Different guide rollers are used for the magazine loops of endless tapes F of different lengths, as shown in FIG. 1, and FIGS. 6 to 11. FIG. 1 shows an endless record carrier tape which has recordings for controlling the needles of a knitting machine during 1 revolution. The lengths of the endless record carrier tapes shown in FIG. 6, 7, and 8 correspond to 2, 3, and 4 revolutions of the needle cylinder, respectively; the length of the endless tape shown in FIG. 9 corresponds to 5, 7 and 8 revolutions; the lengths of the endless tapes shown in FIG. 10 corresponds to 6 and 9 revolutions; and the length of the endless tape shown in FIG. 11 correspond to 10 or more revolutions of the needle cylinders. Guide rollers 415 to 425 also have end portions engaging the tape only in the region of perforated marginal edge portions, similar to the construction shown for the supporting roller 125. Some of the guide rollers, for example guide rollers 418, 419, 421, 424, and 425, are constructed with flanges and shoulders preventing axial displacement of the tape. Consequently, the endless tape can be repeatedly transported and read out without any sliding engagement and friction between the rollers and the central portion of the tape where the recordings are provided.

It will be understood that each of the elements described above or two or more together, may also find a useful application in other types of sensing arrangements for record carrier tapes differing from the types described above.

While the invention has been illustrated and described as embodied in a readout unit selectively combined with different magazine units supporting endless record carrier tapes of different lengths, it is not intended to be limited to the details shown, since various modifications and structural changes may be made without departing in any way from the spirit of the present invention.

What is claimed as new and desired to be protected by Letters Patent is set forth in the appended claims.

I claim:

1. Sensing arrangement for record carrier tapes, comprising, in combination, a plurality of magazine units, each including a first support, two output rollers, a predetermined number of guide rollers, and an endless record carrier tape looped about selected guide rollers and passing between said pair of output rollers to form a free readout loop, said endless record carrier tapes having different lengths and being associated with different operations of a machine, said readout loops of all said magazine units having the same length between said output rollers, said output rollers having the same positions on all first supports; and a readout unit including a second support to which said first support of a selected magazine unit is detachably attached, transporting rollers mounted on said second support and engaging said readout loop of said selected magazine unit for transporting the same and thereby the respective endless record carrier tape, and sensing means for reading out recordings on successive transported portions of said readout loop and generating corresponding impulses for controlling the machine.

2. Sensing arrangement as claimed in claim 1 wherein said machine is a circular knitting machine having needles controlled by said impulses; and wherein each of said endless tapes is associated with a different number of revolutions of said knitting machine.

3. Sensing arrangement as claimed in claim 1 wherein each of said first supports has a central cutout; and wherein said readout unit is located in said cutout of said first support of said selected magazine unit.

4. Sensing arrangement as claimed in claim 1 wherein said readout unit includes means for illuminating said transported and readout portion of said readout loop; wherein said sensing means include a plurality of phototransistors; and wherein each of said endless record carrier tapes has a plurality of tracks respectively read out by said phototransistors, and having light-permeable recordings.

5. Sensing arrangement as claimed in claim 1 wherein said readout unit includes a support roller for supporting said successive transported portions of said readout loop, and being mounted on said second support for free rotation, and opposite said sensing means; and wherein said transporting rollers include two driven transporting rollers respectively leading and trailing said support roller so that the same is rotated by the transported readout loop.

6. Sensing arrangement as claimed in claim 5 wherein said readout unit includes a shaft means fixedly secured to said second support; wherein said support roller includes two roller portions mounted for free rotation spaced from each other on two spaced journal portions of said shaft means for supporting the longitudinal marginal portions of said readout loop; wherein the portion of said shaft means between said journal portions includes transparent optical means; wherein said sensing means is located in front of said support roller and of the transported portion of said readout loop thereon; wherein said readout unit includes illuminating means mounted on said second support in the rear of said support roller so that said transported portion is illuminated through said transparent optical means.

7. Sensing arrangement as claimed in claim 6 wherein said transparent optical means include a filter for heat radiation and a planar-convex cylindrical lens; and wherein said illuminating means include a lamp nd a condenser.

8. Sensing arrangement as claimed in claim 5 wherein each of said magazine units includes means for driving said pair of output rollers for transporting said endless tape at the speed at which said readout loop is transported by said driven transporting rollers of said readout unit.

9. Sensing arrangement as claimed in claim 8 wherein said means for driving includes two output gears respectively secured to said output rollers, and coupling gear means mounted on said first support for movement between an inoperative position and a drive position; and wherein said readout unit includes two drive gears secured to said transporting rollers and an intermediate gear meshing with said two drive gears and with said gear means in said drive position.

10. Sensing arrangement as claimed in claim 9 wherein said first support is a first support plate, and said second support is a second support plate lower than said first support plate of said selected magazine unit; and wherein said coupling gear means includes a journal secured to said first support plate, a coupling gear mounted on said journal for axial movement between said inoperative and drive positions, and a spring biassing said coupling gear into said drive position meshing with said intermediate gear and said output gears, said coupling gear in said inoperative position meshing only with said two output gears.

11. Sensing arrangement as claimed in claim 1 wherein each endless second carrier tape has marginal transporting portions and a central recording portion for recordings; and wherein said guide rollers, output rollers, and transporting rollers have transporting end portions cooperating with said marginal transporting portions, and central smaller portion spaced from said central recording portion.

12. Sensing arrangement as claimed in claim 11 wherein said readout unit includes a support roller freely rotatably mounted on said second support opposite said sensing means and being rotated by said readout loop; wherein said transporting rollers include a pair of transporting rollers leading and trailing said support roller, respectively, in the direction of movement of said endless tape; wherein said trailing transporting roller and the trailing output roller have driven central portions, and marginal transporting portions rotatable on said driven central portions, and include spring means connecting said driven central portions with said marginal transporting portions, respectively.

13. Sensing arrangement as claimed in claim 1 wherein each of said first supports has a central cutout; wherein said second support is located in the cutout of said first support of the selected magazine unit; and wherein said readout unit includes a slide supporting said sensing means and being mounted on said second support for movement toward and away from said transporting rollers.

14. Sensing arrangement as claimed in claim 1 wherein said readout unit includes a support roller for supporting said successive transported portions of said readout loop, and being mounted on said second support for free rotation, and opposite said sensing means; wherein said transporting rollers include two driven transporting rollers respectively leading and trailing said support roller so that the same is rotated by the transported readout loop; wherein each of said first supports has a central cutout; wherein said second support is located in the cutout of said first support of the selected magazine unit; wherein said readout unit includes a slide supporting said sensing means and being mounted on said second support for movement toward and away from said support roller; wherein said support roller, said two drive rollers and two output rollers are disposed symmetrically to a plane; and wherein said slide moves in said plane.

15. Sensing arrangement as claimed in claim 1 wherein each magazine unit includes a pressure roller mounted on said first support for movement between an operative position abutting said two output rollers for holding said endless tape on the same, and a retracted inoperative position.

16. Record carrier tape magazine arrangement, comprising, in combination, a plurality of endless record carrier tapes having different lengths, each endless tape being formed into differently shaped and positioned magazine loops and into a readout loop having the same length in all said endless tapes; and a magazine including a support, and a plurality of guide rollers and two output rollers mounted on said support for rotation, said guide rollers being disposed for supporting said differently positioned magazine loops of any selected one of said endless record carrier tapes, and said readout loop of said selected endless record carrier tape projecting between said output rollers in a position adapted to be read out whereby the same magazine can be used for a plurality of endless record carrier tapes of different lengths having information of different length recorded thereon.

UNITED STATES PATENT OFFICE
CERTIFICATE OF CORRECTION

Patent No. 3,566,138          Dated February 23, 1971

Inventor(s) Gernot Gottschall

It is certified that error appears in the above-identified patent and that said Letters Patent are hereby corrected as shown below:

On the cover sheet [31] "P.17.97 14.9" should read -- P 17 97 146.9 --.

Signed and sealed this 30th day of November 1971.

(SEAL)
Attest:

EDWARD M. FLETCHER, JR.        ROBERT GOTTSCHALK
Attesting Officer              Acting Commissioner of Pate